(12) United States Patent
Lindholm et al.

(10) Patent No.: US 6,975,321 B1
(45) Date of Patent: Dec. 13, 2005

(54) SYSTEM AND METHOD FOR GENERATING MULTIPLE OUTPUTS IN A SINGLE SHADER PROCESSING PASS IN A HARDWARE GRAPHICS PIPELINE

(75) Inventors: John Erik Lindholm, Saratoga, CA (US); Steven E. Molnar, Chapel Hill, NC (US); Harold Robert Feldman Zatz, Palo Alto, CA (US)

(73) Assignee: NVIDIA Corporation, Santa Clara, CA (US)

( * ) Notice: Subject to any disclaimer, the term of this patent is extended or adjusted under 35 U.S.C. 154(b) by 277 days.

(21) Appl. No.: 10/430,629

(22) Filed: May 5, 2003

(51) Int. Cl.[7] ............................................. G06T 15/80
(52) U.S. Cl. ..................................... 345/506; 345/426
(58) Field of Search ............................... 345/419, 426, 345/582, 503, 506, 522, 536

(56) References Cited

U.S. PATENT DOCUMENTS

| | | | |
|---|---|---|---|
| 6,236,413 B1 * | 5/2001 | Gossett et al. ............... | 345/506 |
| 6,259,460 B1 * | 7/2001 | Gossett et al. ............... | 345/552 |
| 6,392,655 B1 * | 5/2002 | Migdal et al. ............... | 345/582 |
| 6,593,923 B1 | 7/2003 | Donovan et al. ............ | 345/422 |
| 6,690,372 B2 | 2/2004 | Donovan et al. ............ | 345/426 |
| 6,690,672 B1 | 2/2004 | Klein et al. .................. | 345/426 |
| 6,760,033 B2 * | 7/2004 | Chen et al. .................. | 345/519 |
| 6,809,739 B2 * | 10/2004 | Farinelli et al. ............. | 345/582 |
| 6,819,325 B2 * | 11/2004 | Boyd et al. .................. | 345/559 |
| 2003/0020741 A1 * | 1/2003 | Boland et al. ............... | 345/700 |
| 2004/0003370 A1 * | 1/2004 | Schenk et al. ............... | 717/100 |

OTHER PUBLICATIONS

E. Chan, R. Ng, P. Sen, K. Proudfoot, and P. Hanrahan. Effient Partitioning Of Fragment Shaders For Multipass Rendering O Programmable Graphics Hardware. In SIGGRAPH/EUROGRAPHICS Workshop On Graphics Hardware (2002), pp. 69-78.*

E. Lindholm, M. Kilgard, and H. Moreton. A User-Programmable Vertex Engine. In ACM SIGGRAPH 2001, pp. 140-158.*

W. Mark and K. Proudfoot. Compiling to a VLIW Fragment Pipeline. In Proceedings of 2001 SIGGRAPH/Eurographics Workshop on Graphics Hardware, pp. 47-55.*

C. Wittenbrink. R-Buffer: A Pointerless A-Buffer Hardware Architecture. In Proceedings of The ACM SIGGRAPH/Eurographics Workshop on Graphics Hardware (2001), pp. 73-80.*

M. McCool and W. Heidrich. Texture Shaders. In Proceedings of the ACM SIGGRAPH/Eurographics Workshop on Graphics Hardware (1999), pp. 117-126.*

M. Olano and A. Lastra. A Shading Language on Graphics Hardware: The PixelFlow Shading System. In Proceedings of SIGGRAPH 1998, pp. 1-10.*

M. Peercy, M Olano, J. Airey, and P. Ungar. Interactive Multi-Pass Programmable Shading. In Proceedings of The 27th Annua Conference on Computer Graphics and Interactive Techniques (Jul. 2000), pp. 425-432.*

(Continued)

Primary Examiner—Kee M. Tung
(74) Attorney, Agent, or Firm—Zilka-Kotab, PC

(57) ABSTRACT

A system and method are provided for generating multiple output packets in a single processing pass of a shader in a hardware graphics pipeline. Initially, graphics data is received, after which it is processed utilizing the shader of the hardware graphics pipeline to generate a plurality of output packets. The plurality of output packets is outputted from the shader of the hardware graphics pipeline in the single processing pass.

28 Claims, 4 Drawing Sheets

OTHER PUBLICATIONS

K. Proudfoot, W. Mark, S. Tzvetkov, and P. Hanrahan. A Real-Time Procedural Shading System for Programmable Graphics Hardware. In ACM SIGGRAPH 2001, pp. 159-170.* http://developer.nvidia.com/object/Filter_Blitting.html, May 10, 2001.

"NVIDIA OpenGL Extension Specifications", NVIDIA Corporation, Nov. 26, 2001.

William R. Mark et al., "The F-Buffer: A Rasterization-Order FIFO Buffer for Multi-Pass Rendering", SIGGRAPH/Eurographics Graphics Hardware Workshop 2001.

"NVIDIA OpenGL Extension Specifications", NVIDIA Coporation, Jun. 10, 2003.

* cited by examiner

No newline at end of file
SYSTEM AND METHOD FOR GENERATING MULTIPLE OUTPUTS IN A SINGLE SHADER PROCESSING PASS IN A HARDWARE GRAPHICS PIPELINE

FIELD OF THE INVENTION

The present invention relates to computer graphics processing, and more particularly to shader processing in a hardware graphics pipeline.

BACKGROUND OF THE INVENTION

Recent advances in computer performance have enabled hardware graphics systems to provide more realistic graphical images using personal computers and home video game computers. In such graphic systems, some procedure must be implemented to "render" or draw graphic primitives to the screen of the system. A "graphic primitive" is a basic component of a graphic picture, such as a polygon, a triangle, a line or a point. All graphic pictures are formed with combinations of these graphic primitives. Many procedures may be utilized to perform graphic primitive rendering.

Early graphic systems displayed images representing objects using just colored polygons. That is, textures, bumps, scratches, or other surface features were very expensive to model because they had to be drawn with individual polygons. In order to improve the quality of the image, texture mapping was developed to model the complexity of real world surface images. In general, texture mapping is the mapping of an image or a function onto a surface. Texture mapping is a relatively efficient technique for creating the appearance of a complex image without the tedium and the high computational cost of rendering the actual three dimensional detail that might be found on a surface of an object.

In recent prior art, texture mapping has been conducted with pixel shading techniques. Prior Art FIG. 1 illustrates a graphics system 100 equipped with pixel shading capabilities. As shown, the graphics system 100 is equipped with a 3-D graphics pipeline 108 capable of receiving graphics data 102, 104, 106. Such graphics data may include geometry which is transform, lighted, and rendered during the course of graphics processing utilizing the 3-D graphics pipeline 108. Various aspects of the foregoing processing may be performed utilizing a shader component of the 3-D graphics pipeline 108.

Once the graphics data is processed, it is saved in a frame buffer 112 in the form of output packets 110 that are adapted for being depicted on a display 114. It should be noted that the location in which the graphics data is stored is based on instructions 109 associated with the 3-D graphics pipeline 108.

One of the key advantages of this graphics system 100 is that processing for graphics data can "loop." In one context, a first loop 115 may be employed to process graphics data during multiple instances in a single processing pass in the 3-D graphics pipeline 108. In particular, the processing can loop many times and use a variety of math operations to blend texture and color data, and to compute new texture coordinates, allowing a much more complicated and visually rich resulting image. Still yet, during a second loop 116, the graphics data resulting from one processing pass in the 3-D graphics pipeline 108 can influence the processing of graphics data in a subsequent pass in the 3-D graphics pipeline 108.

In any case, the number of output packets 110 that may be output and saved to the frame buffer 112 is limited to one, during the course of a single pass in current graphics pipeline implementations. This feature inherently limits the amount of graphics data that may be processed and, more importantly, saved to the frame buffer 112 in a single pass.

There is thus a need for a technique of storing multiple output packets of processed graphics data to a frame buffer in a single pass.

SUMMARY OF THE INVENTION

A system and method are provided for generating multiple output packets in a single processing pass of a shader in a hardware graphics pipeline. Initially, graphics data is received, after which it is processed utilizing the shader of the hardware graphics pipeline to generate a plurality of output packets. The plurality of output packets is outputted from the shader of the hardware graphics pipeline in the single processing pass.

In one embodiment, the plurality of output packets may be stored in a plurality of defined buffers in memory. As an option, the plurality of defined buffers may be identified utilizing tags associated with the plurality of output packets. Further, the plurality of output packets may be stored in the defined buffers in accordance with a predetermined time slot.

In another embodiment, the plurality of output packets may be each associated with a corresponding primitive, a PC packet, an object, a previous output packet, etc. Still yet, the plurality of output packets may include floating point values, vectors, etc.

In still another embodiment, the output packets may be fed back to the shader during the single processing pass for further processing. Such plurality of output packets may further be output to memory positioned on a semiconductor platform on which the shader is positioned. Moreover, the plurality of output packets may be output to memory positioned externally from a semiconductor platform on which the shader is positioned.

As an option, the plurality of output packets may be output to the memory utilizing x-values and y-values corresponding to a pixel associated with the graphics data. Further, the shader may be programmable for allowing the plurality of output packets to be output to different memory. Still yet, the plurality of output packets may be conditionally output to memory based on a test.

As a further option, a format of the plurality of output packets may match a format of the defined buffers. Further, the plurality of output packets may be read as textures by the shader.

BRIEF DESCRIPTION OF THE DRAWINGS

Prior Art

DESCRIPTION OF THE PREFERRED EMBODIMENTS

Figure 1:
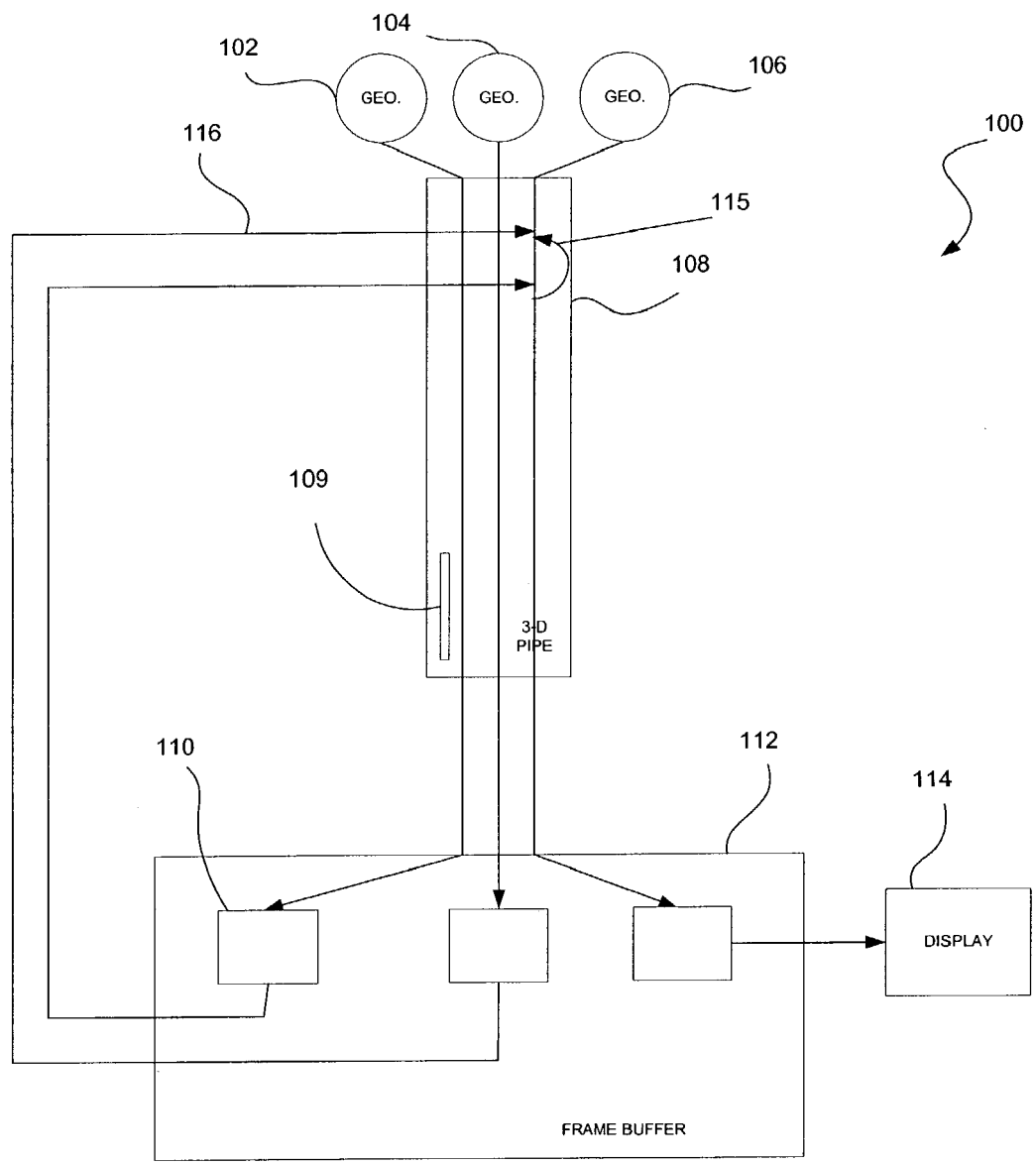
FIG. 1 illustrates a graphics system equipped with pixel shading capabilities.
Figure 2:
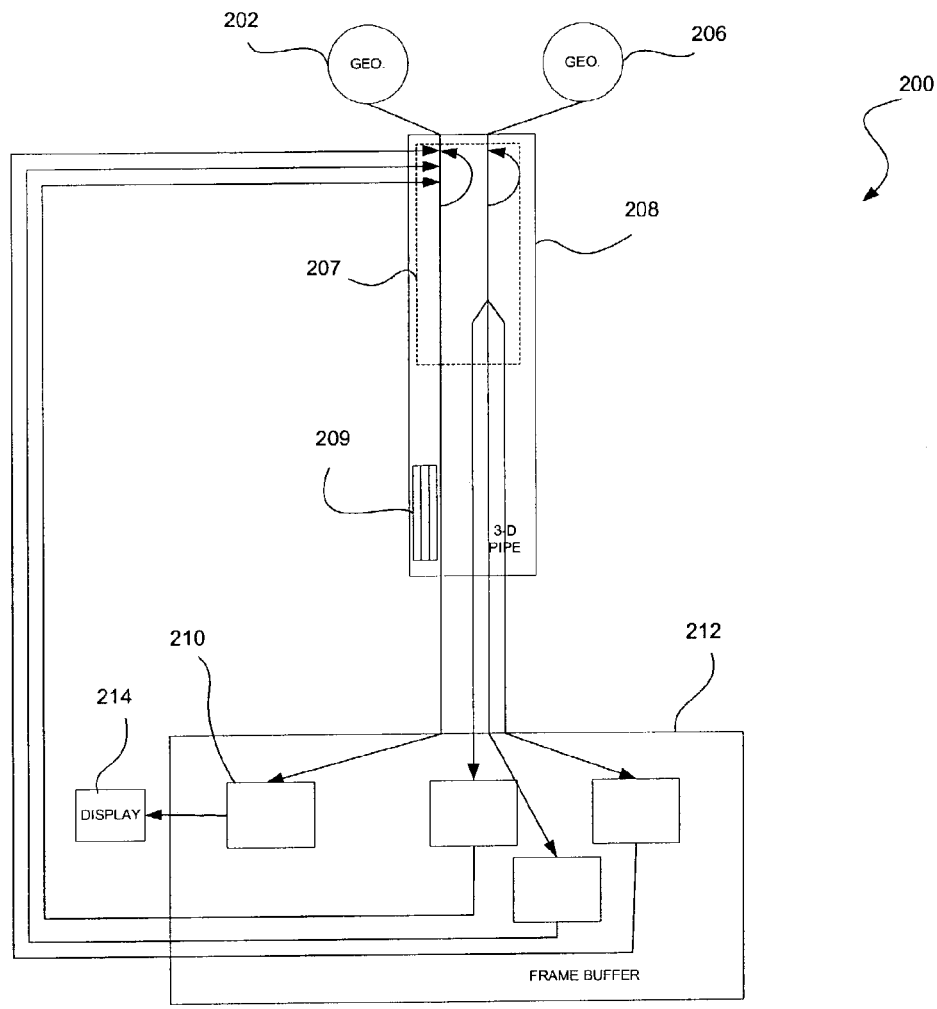
FIG. 2 illustrates a graphics system equipped with pixel shading capabilities, in accordance with one embodiment.

FIG. 2 illustrates a graphics system 200 equipped with pixel shading capabilities, in accordance with one embodiment. As shown, the graphics system 200 is equipped with a 3-D graphics pipeline 208 capable of receiving graphics data 202, 206. Such graphics data 202, 206 may include geometry or any other data capable of being transformed, lighted, rendered and/or subject to any other type of graphics processing utilizing the 3-D graphics pipeline 208. It should be noted that the 3-D graphics pipeline 208 may include a shader 207.

In the context of the present description, the shader 207 may include any module, logic, etc. that is capable of carrying out shading operations on the graphics data. More exemplary information regarding an optional embodiment of the shader 207 will be set forth in greater detail during reference to FIG. 3.

Once the graphics data is processed, it is saved in memory (i.e. frame buffer 212) in the form of output packets 210 that are adapted for being depicted on a display 214. Still yet, each of the plurality of output packets 210 may or may not be associated with a corresponding primitive, a PC packet, an object, a previous output packet, etc. In any case, the plurality of output packets may include floating point values, vectors, or any desired graphics data resulting from the processing by the 3-D graphics pipeline 208 that relates to at least one pixel.

An aspect of the present embodiment is that the number of output packets 210 to be output and saved to the frame buffer 212 during a single graphics processing pass may be more than one. A benefit of such functionality is that it overcomes many limits in the amount of graphics data that may be processed and saved to memory in a single pass.

In use, the location in which the graphics data is stored is based on instructions 209 associated with the 3-D graphics pipeline 108. As an option, the present graphics system 200 may be capable of looping the processing of graphics data. For use during writing to memory, a plurality of byte masks may optionally be generated by the shader 207.

It should be understood that the plurality of output packets 210 may be output to memory positioned on a semiconductor platform on which the shader 207 is positioned. In the present description, the semiconductor platform may refer to a sole unitary semiconductor-based integrated circuit or chip. It should be noted that the term semiconductor platform may also refer to multi-chip modules with increased connectivity which simulate on-chip operation, and make substantial improvements over utilizing a conventional packaged chip to printed-circuit-board interconnect.

For example, the memory may be positioned on a hardware graphics accelerator integrated circuit including the shader 207. In the alternative, the plurality of output packets 210 may be output to memory positioned externally from a semiconductor platform on which the shader 207 is positioned. For instance, the memory may be shared between a hardware graphics accelerator integrated circuit including the shader 207, and a central processing unit (CPU).

As an option, the output packets may be stored in a plurality of discrete defined buffers in memory, where a format of the output packets may match a format of the defined buffers. For example, such formats may include 4-byte, 8-byte, and/or 16-byte formats. It should be noted that the different buffers may be uniquely formatted to accommodate the associated output packets.

For example, the format may include a quadruplet of color values (i.e. A, B, G, R). Still yet, several output packets may be provided, each containing a color value or position vector. Moreover, the output packets may include packed sub-output packets (i.e. four 8-bit colors packed into a 32-bit data type, with four such 32-bit data types forming an output packet, etc.).

As a further option, such defined buffers may be identified utilizing tags (i.e. identifiers, etc.) associated with the plurality of output packets. Memory addresses may even be calculated from such tags in any desired manner.

Further, the output packets may be stored in the defined buffers in accordance with a predetermined time slot. In such embodiment, buffers may receive output packets as a function of a time slot in which the output packet is outputted, or some other timing scheme.

Still yet, the plurality of output packets 210 may optionally be output to the memory utilizing x-values and y-values corresponding to a pixel associated with the graphics data. Specifically, the location in memory where the output packets 210 are stored may vary as a function of the x-values and the y-values.

In a culling embodiment, the plurality of output packets 210 may be conditionally output to memory based on a test involving a z-value associated with the graphics data. In one embodiment, such test may involve reading a stored z-value associated with at least one pixel of the graphics data. Thereafter, it may be determined whether the stored z-value is in front of a primitive z-value. Output packets may then be conditionally output to memory based on this determination.

For feedback purposes, the plurality of output packets may be read as textures or by other techniques using the shader 207. More information regarding one exemplary way the shader 207 may operate will now be set forth.

Figure 3:
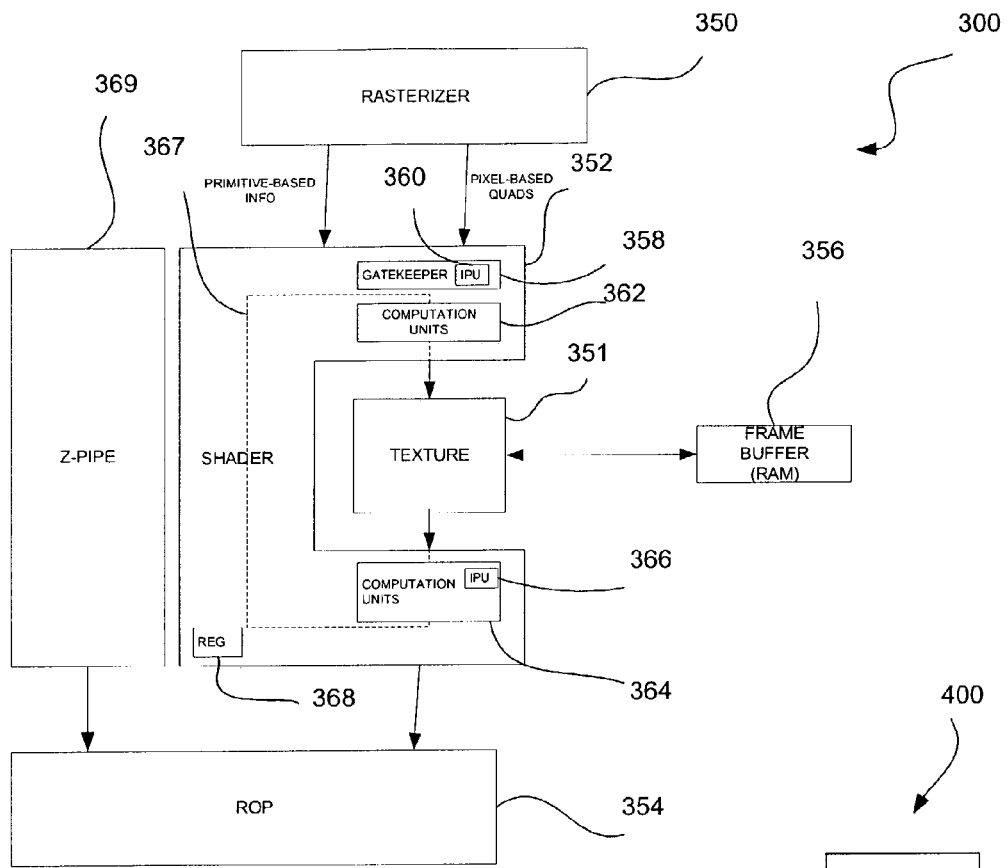
FIG. 3 illustrates a shader system with pixel shading capabilities, in accordance with another embodiment.

FIG. 3 illustrates a shader system 300 with pixel shading capabilities, in accordance with another embodiment. As an option, the present shader system 300 may be implemented in the context of the shader 207 of the graphics system 200 of FIG. 2. Of course, the shader system 300 may be carried out in any desired context.

As shown, the shader system 300 of the present embodiment includes a rasterizer 350 capable of processing graphics data for generating primitive-based information and pixel-based quads (i.e. groups of pixels). For example, the rasterizer 350 may generate pixel coverage and parameters that may be used by the shader module 352. This processed graphics data is fed to a shader module 352 including a plurality of components.

In particular, the shader module 352 includes a gatekeeper module 358 which, in turn, includes a first instruction processor unit (IPU) 360. Coupled to the gatekeeper module 358 is a first set of computation units 362. Associated therewith is a second set of computation units 364 which is also equipped with a second IPU 366. The shader module 352 is further equipped with a plurality of registers 368.

Associated with the shader module 352 is a texture module 351 which is adapted to retrieve instructions and textures from memory 356 (i.e. frame buffer). Operating in parallel with the shader module 352 is a z-pipeline 369 that is capable of conducting various tests involving the z-values of the graphics data. Both the shader module 352 and the z-pipeline 369 feed into a raster processor (ROP) 354.

In use, the graphics data is received from the rasterizer 350 by the gatekeeper module 358 of the shader module 352. Instructions associated with a shader program are then processed by the first IPU 358 in order to determine the manner in which the graphics data is to be processed by the shader module 352. A first portion of such processing is carried out by the first set of computation units 362. The results of such processing and the instructions are then used by the texture module 351 for retrieving additional information (i.e. instructions, textures, other graphics data, etc.) from the memory 356.

The results of the first portion of processing and/or the information retrieved via the texture module 351 may then be processed by the second set of computation units 364, in accordance with the processing of instructions of the second IPU 366. The results of such second portion of processing may then be output to the ROP 354 or looped 367 for additional processing in the foregoing manner. When looped, previous results may be used at least in part to retrieve additional information using the texture module 351. Thus, the instructions may be used to process texels, pixels, and/or primitives, etc. in a very flexible manner. In any case, the processing results in output packets (i.e. any desired graphics data resulting from the processing).

Figure 4:
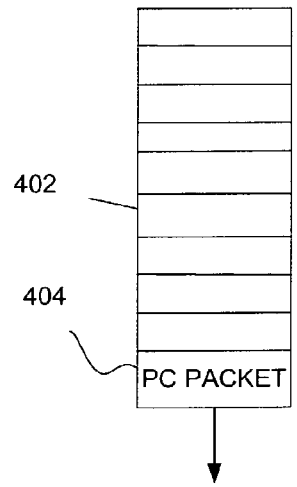
FIG. 4 illustrates an example of a PC packet system, in accordance with one embodiment.

When the output packets resulting from the processing are ready for output, they may be stored to memory. As mentioned earlier, the plurality of output packets may be each associated with a corresponding primitive, a PC packet, an object, a previous output packet, etc. FIG. 4 illustrates an example of a PC packet system 400, in accordance with one embodiment. As shown, the PC packet system 400 includes a PC packet 404 that precedes and identifies graphics data 402. In particular, the PC packet 404 may include a packet of data that flows through a shader, configuring it to execute a subsequent instruction. Specifically, such packet of data may include a location in a program [i.e. thus serving as a program counter (PC) packet].

As an option, the present shader system 300 may store intermediate graphics data (i.e. colors, other values, etc.) that are generated during a rendering pass in a first-in first-out (FIFO) buffer as the graphics data exits the shader system 300. On a subsequent pass, the contents of the FIFO buffer may be fed into the top of the pipeline. This FIFO buffer may be referred to as a fragment-stream buffer (F-buffer), because this approach may have the effect of associating intermediate results with particular rasterization fragments, rather than with an (x,y) location in a frame buffer. Each rendering pass may use the same viewpoint and geometry, but a different pipeline configuration. More information on such F-buffer may be found with reference to William R. Mark, Kekoa Proudfoot. "The F-Buffer: A Rasterization-Order FIFO Buffer for Multi-Pass Rendering." *In Proceedings of SIGGRAPH/Eurographics Workshop on Graphics Hardware* 2001, which is incorporated herein by reference.

In any case, a plurality of such output packets may be stored to memory in a single pass. Such output packets may be stored in separate locations in a frame buffer and addressed in a manner that allows subsequent retrieval during different rendering passes.

Figure 5:
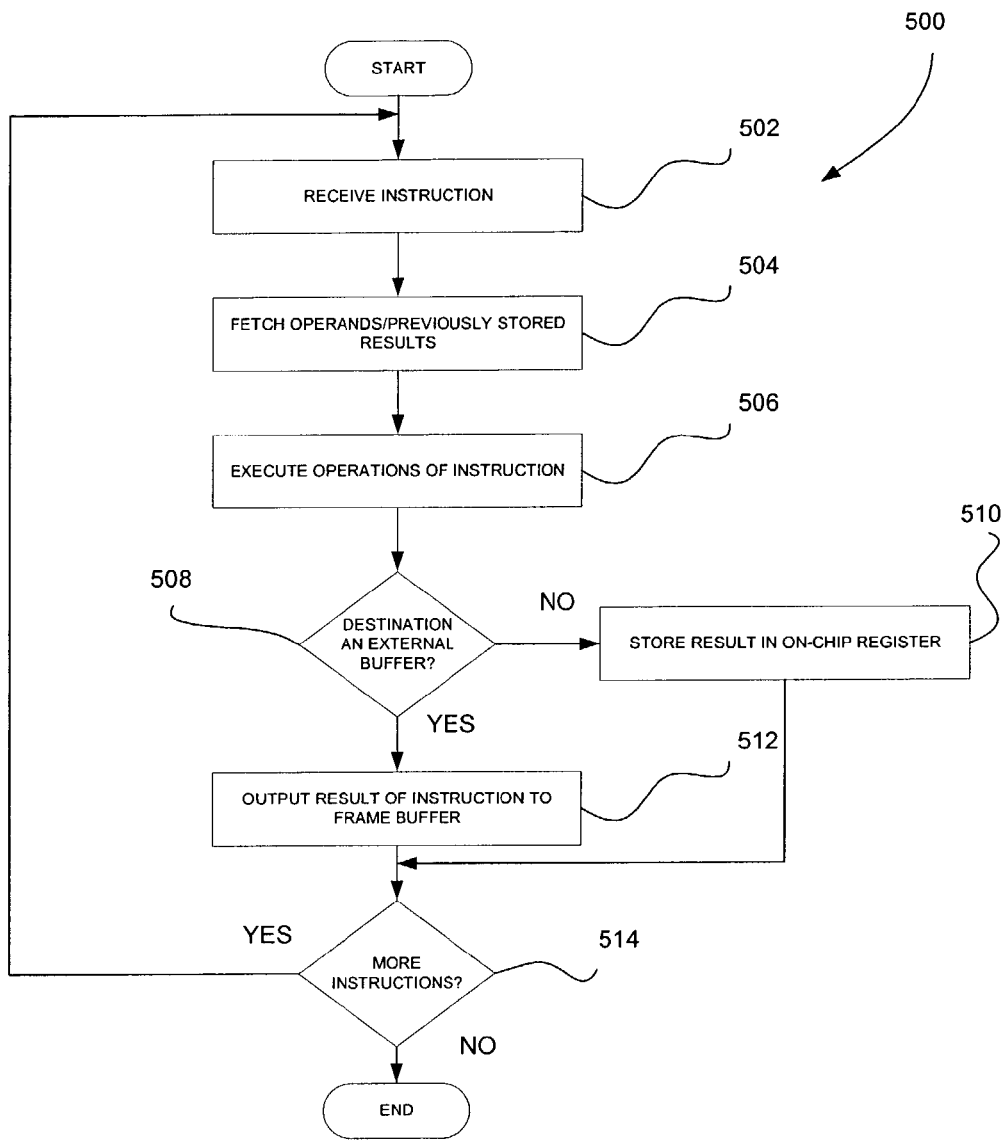
FIG. 5 illustrates a method for generating multiple outputs in a single processing pass of a shader in a hardware graphics pipeline, in accordance with one embodiment.

FIG. 5 illustrates a method 500 for generating multiple outputs in a single processing pass of a shader in a hardware graphics pipeline, in accordance with one embodiment. In one embodiment, the present method 500 may be implemented in the context of the architectures of FIGS. 2 and 3. Of course, however, the present method 500 may be implemented in any desired context.

It should be noted that the method 500 shown in FIG. 5 represents a single pass. Of course, the present method 500 may be carried out multiple times in a multiple-pass system, where each pass is controlled by separate or different instances of a shader program.

In operation 502, at least one instruction of a certain portion of a program is received. Next, in operation 504, operands identified by the at least one instruction are fetched. Further, if the current pass is after a first pass, the memory associated with one or more previously-processed output packets may be identified for feeding the plurality of output packets back to the shader.

Next, in operation 506, operations associated with the at least one instruction of the program are executed in order to generate one or more output packet(s) in a single processing pass of the shader utilizing the zero, one or more fed back output packets. It should be noted that such operations may include vector operations. With the current output packet(s) generated, it is then determined in decision 508 as to whether such output packet(s) are to be stored in on-chip registers or in a frame buffer.

If it is determined in decision 508 that the current output packet(s) are to be stored in on-chip registers, this is accomplished in operation 510. On the other hand, if it is determined in decision 508 that the current output packet(s) are to be stored in the frame buffer, this is accomplished in operation 512.

Finally, it is determined whether any additional instructions exist in decision 514. If so, the method 500 begins again at operation 502.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents. The order of elements within claims does not indicate any particular order of steps or operations.

What is claimed is:

1. A method for generating multiple output packets in a single processing pass of a shader in a hardware graphics pipeline, comprising:
   receiving graphics data;
   processing the graphics data utilizing the shader of the hardware graphics pipeline to generate a plurality of output packets;
   outputting the plurality of output packets from the shader of the hardware graphics pipeline in the single processing pass; and
   feeding back the plurality of output packets to the shader during the single processing pass for further processing.

2. The method as recited in claim 1, wherein the plurality of output packets are stored in a plurality of defined buffers in memory.

3. The method as recited in claim 2, wherein the plurality of defined buffers is identified utilizing tags associated with the plurality of output packets.

4. The method as recited in claim 3, wherein a memory address is calculated from each tag.

5. The method as recited in claim 2, wherein the plurality of output packets are stored in the defined buffers in accordance with a predetermined time slot.

6. The method as recited in claim 2, wherein a format of the plurality of output packets matches a format of the defined buffers.

7. The method as recited in claim 2, wherein the plurality of output packets are read as textures.

8. The method as recited in claim 7, wherein the plurality of output packets are read as textures by the shader.

9. The method as recited in claim 2, wherein the defined buffers are uniquely formatted to accommodate associated output packets.

10. The method as recited in claim 1, wherein the plurality of output packets are each associated with a corresponding primitive.

11. The method as recited in claim 1, wherein the plurality of output packets are each associated with a corresponding PC packet.

12. The method as recited in claim 1, wherein the plurality of output packets are each associated with a corresponding object.

13. The method as recited in claim 1, wherein the plurality of output packets are associated with previous output packets.

14. The method as recited in claim 13, wherein the previous output packets are used for retrieving additional information from memory including instructions and textures.

15. The method as recited in claim 1, wherein the plurality of output packets include floating point values.

16. The method as recited in claim 1, wherein the plurality of output packets include vectors.

17. The method as recited in claim 1, wherein the plurality of output packets are output to memory positioned on a semiconductor platform on which the shader is positioned.

18. The method as recited in claim 1, wherein the plurality of output packets are output to memory positioned externally from a semiconductor platform on which the shader is positioned.

19. The method as recited in claim 18, wherein the plurality of output packets are output to the memory utilizing x-values and y-values corresponding to a pixel associated with the graphics data.

20. The method as recited in claim 18, wherein the memory is shared by a central processing unit.

21. The method as recited in claim 1, wherein the shader is programmable for allowing the plurality of output packets to be output to different memories.

22. The method as recited in claim 21, wherein the different memory includes a first memory positioned on a semiconductor platform on which the shader is positioned, and a second memory positioned externally from the semiconductor platform on which the shader is positioned.

23. The method as recited in claim 1, wherein the plurality of output packets are conditionally output to memory based on a test.

24. The method as recited in claim 23, wherein the test includes determining whether a stored Z value associated with at least one pixel of the graphics data is in front of a primitive Z value.

25. A system for generating multiple output packets in a single processing pass, comprising:
 a shader of a hardware graphics pipeline for processing graphics data to generate a plurality of output packets in the single processing pass; and
 memory coupled to the shader, the memory adapted for storing the plurality of output packets from the shader of the hardware graphics pipeline;
 wherein the plurality of output packets are fed back to the shader during the single processing pass for further processing.

26. A system for generating multiple output packets in a single processing pass, comprising:
 shader means for processing graphics data to generate a plurality of output packets in the single processing pass; and
 memory adapted for storing the plurality of output packets;
 wherein the plurality of output packets are fed back to the shader means during the single processing pass for further processing.

27. A method for storing multiple output packets of a shader in a hardware graphics pipeline, comprising:
 processing graphics data utilizing the shader of the hardware graphics pipeline to generate a plurality of output packets;
 storing the plurality of output packets to memory positioned externally from a semiconductor platform on which the shader is positioned; and
 feeding back the plurality of output packets to the shader during the single processing pass for further processing.

28. A method for generating multiple output packets in a single processing pass of a shader in a hardware graphics pipeline, comprising:
 receiving graphics data in the hardware graphics pipeline;
 during a first pass, executing a first portion of a program in the shader of the hardware graphics pipeline by:
  receiving at least one instruction of the first portion of the program,
  fetching operands identified by the at least one instruction of the first portion of the program,
  executing operations associated with the at least one instruction of the first portion of the program in order to generate a plurality of output packets in the single processing pass of the shader,
  identifying a memory corresponding with a destination associated with the at least one instruction of the first portion of the program, and
  storing the plurality of output packets to the memory; and
 during a second and subsequent passes, executing a second portion of the program in the shader of the hardware graphics pipeline by:
  receiving at least one instruction of the second portion of the program,
  fetching operands associated with the at least one instruction of the second portion of the program,
  identifying the memory associated with the plurality of output packets for feeding the plurality of output packets back to the shader,
  executing operations associated with the at least one instruction of the second portion of the program in order to generate at least one additional output packet in another single processing pass of the shader utilizing the fed back plurality of output packets,
  identifying a memory corresponding with a destination associated with the at least one instruction of the second portion of the program, and
  storing the at least one additional output packet to the memory;
 wherein the plurality of output packets are fed back to the shader during at least one of the single processing passes for further processing.

* * * * *